Sept. 5, 1944.　　　F. H. PARKS　　　2,357,282
ILLUMINATED PELORUS
Filed Feb. 8, 1943
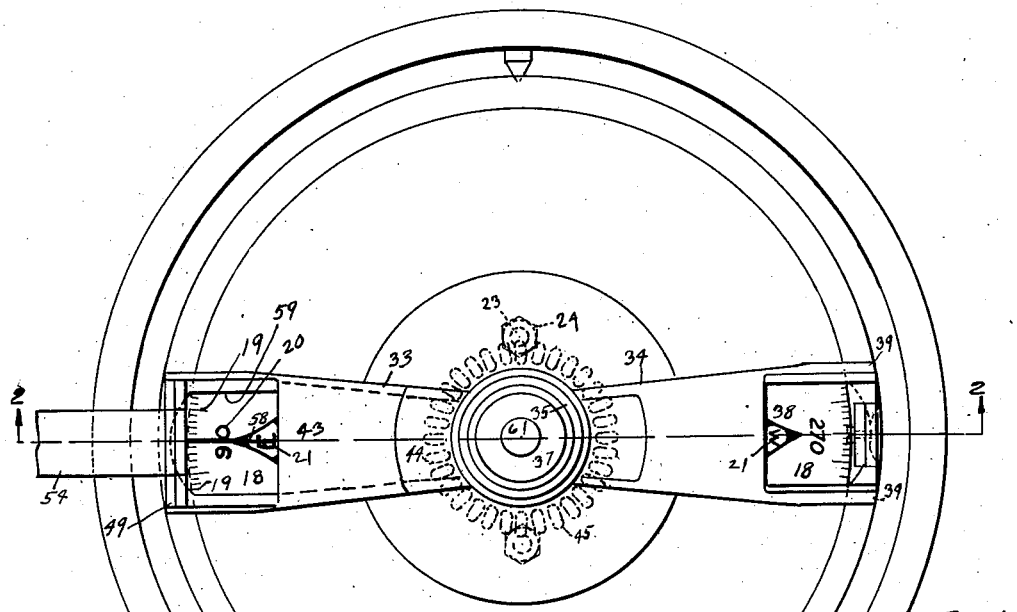
FIG. 1
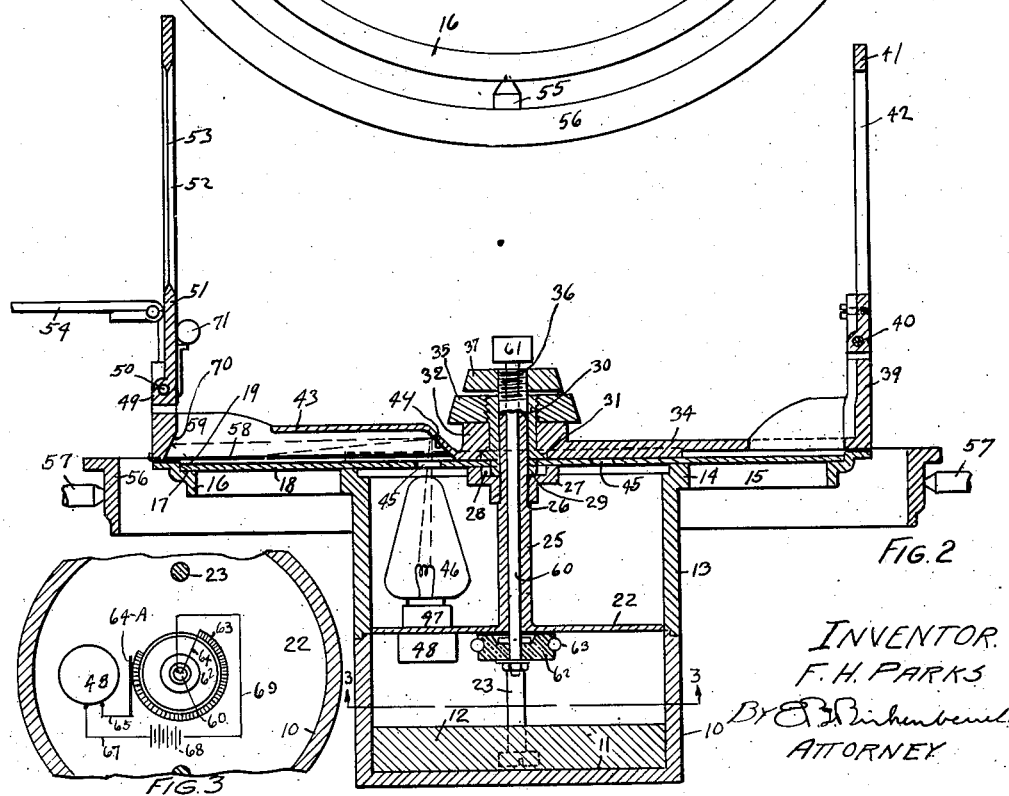
FIG. 2
FIG. 3
INVENTOR.
F. H. PARKS
ATTORNEY Patented Sept. 5, 1944

2,357,282

UNITED STATES PATENT OFFICE 2,357,282

ILLUMINATED PELORUS

Frank H. Parks, Portland, Oreg.

Application February 8, 1943, Serial No. 475,133

1 Claim. (Cl. 240—2.1)

This invention relates generally to navigation instruments, and particularly to an illuminated pelorus.

The main object of this invention is to provide a pelorus with a means for illuminating only that portion of its dial where a reading is taken, and to make it possible to easily control the amount of illumination.

The second object is to provide an illuminated pelorus which will not employ a transparent dial having general illumination which detracts from the efficiency of the illumination and is unnecessarily hazardous when exposed to the observation of an enemy.

The third object is to construct a device of the class described which will not in any way interfere with the normal operation of the pelorus, and at the same time will be easy to manufacture and maintain in proper working order.

The fourth object is to eliminate the glass dial, which is subject to breakage, and which will be substantially water-proof.

I accomplish these and other objects in the manner set forth in the following specification, as illustrated in the accompanying drawing, in which:

Fig. 1 is a plan of a pelorus with parts broken away in section.

Fig. 2 is a vertical section taken along the line 2—2 in Fig. 1.

Fig. 3 is a fragmentary section taken along the line 3—3 in Fig. 2.

Similar numerals refer to the same or similar parts throughout the several views.

Referring in detail to the drawing, there is shown a cylindrical base 10 having a closed bottom 11. A lead weight 12 is placed on the bottom 11 to provide stability for the device. On the cylindrical portion 10 is a cylindrical wall 13 around whose uppermost end is formed a flange 14 from which radiate the spokes 15 around which is formed the circular rim 16 having a shoulder recess 17 for the support of the metallic disc or dial 18 on which are calibrated the degrees 19 of a circle, together with the values in degrees 20, as well as the divisions of the circle in eighths— such as S, SW, W, etc.

The cylindrical portion 13 is provided with a bottom 22 which is held in place by the two bolts 23 whose lower ends are imbedded in the lead 12 and whose upper ends are provided with the nuts 24 on the top side of the floor 22. The cylindrical portions 10 and 13 are preferably shaped as shown to insure a concentric relationship and to form a water shed at the joint of the two members.

Integral with the floor 22 is a post 25 upon whose reduced upper end 26 is mounted a collar 27 whose recessed upper side 28 receives the shouldered center 29 of the dial 18. The dial 18 is provided with an externally threaded tubular stem 30 at the base of which is a flange 31, the stem 30 is secured to the dial 18.

The tubular stem 30 has mounted thereon the hub 32 from which project the alidade arms 33 and 34 which may rotate with relation to the dial 18 or be fixed with relation thereto by means of the knurled clamping nut 35 which is threaded on the upper end of the stem 30 and bears against the top side of the hub 32 enabling it to be clamped against the flange 31. The upper end 36 of the post 25 is threaded to receive the knurled clamping nut 37 by means of which the alidade arms 33 and 34, as well as the dial 18, may be held against rotation provided the nut 35 is also tightened.

The rearmost alidade arm 34 has a substantially square side opening 38 formed therein while on its outer end are formed the upright standards 39 on whose horizontal pin 40 is mounted the foldable leaf 41 having a sighting slot 42 formed therein. The slot 42 enables one to sight in a vertical plane across the center of the dial 18 and normal thereto.

The forward arm 33 resembles the arm 34 but is hollowed on the under side of the portion 43 whose rearmost end 44 is sloping and acts as a reflecting surface. The dial 18 is perforated or provided with the slots 45 through which light may pass vertically from the electric lamp 46 mounted in the socket 47 of the base 48 which is secured to the floor 22.

The forward arm 33 is provided with the upright standards 49 on whose pin 50 is mounted the folded leaf 51 provided with a slot 52 in which is mounted the sighting vane 53. It is desirable to provide the leaf 51 with a folding leaf 54 containing a colored transparency for use in bright sunlight or in the face of strong artificial light.

It will be understood that the circular rim 16 can rock on the trunnions 55 which are mounted in the ring 56 whose trunnion 57 may be suitably mounted on any support in order to hold the bottom 11 in a free position so that the foldable leaves 41 and 51 will automatically remain in a vertical position. A fine wire 58 is placed across the opening 59 in the arm 33 in a radial direction and close to the calibrated surface of the dial 18.

Extending downwardly through the post 25 is the stem 60 on whose upper end is secured the button 61 of a combined rheostat and switch consisting of a disc 62 of insulating material which is keyed on the lower end of the stem 60 and carries a resistance wire 63, one end of which is grounded by a wire 64 to the stem 60. A brush 64 bears against the resistance wire 63 as the button 61 is turned. The brush 64a is connected by a wire 65 to a lamp 66 whose second wire 67 is connected to the source of electrical energy 68 which in this case is illustrated as being grounded to the stem 60 by means of the wire 69.

It can be seen from the foregoing, that in the operation of this device, the mariner when taking a reading under poor light conditions merely turns the button 61 until current flows through the wire 63 providing the maximum resistance and the least amount of light, which light is projected through the slots 45 and reflected by the surface of the underside of the member 43 either directly against the calibrations on the dial 18 or against the sloping face 70 formed on the inner sides of the standards 49, and then reflected back to the calibrations.

The main point to be observed, is that the illuminated field is entirely within the square 59 and the amount of illumination may be easily and quickly controlled by the rotation of the button, 61.

It is desirable to provide the leaf 51 with a spirit level 71 to insure the vane 53, and consequently the sighting slot 42, being in the same vertical plane passing through the line of observation.

No attempt is being made herein to claim the invention of the pelorus, but only the improved form of illuminated pelorus as is set forth in the appended claim.

I claim:

In a device of the class described, the combination of a supporting ring, an opaque dial revolvable on said ring, an alidade mounted on said dial, a folding leaf at each end of said alidade, one end of said alidade having a light conducting channel formed on its under side and having a substantially rectangular aperture formed at the outer end of said arm communicating with said channel, an electric lamp disposed beneath said dial, and a combined switch and rheostat for controlling the flow of current to said lamp, said dial having openings formed therein, all of which are covered by said alidade except those which register with said channel, whereby light may pass from said lamp through the dial openings, along said channel and into the aperture of the alidade arm for the purpose of illuminating that portion of the dial contained within said aperture.

FRANK H. PARKS.